F. H. CLIFT.
INSTRUMENT FOR INDICATING THE VELOCITY OF THE WIND OR OF AIR CURRENTS.
APPLICATION FILED MAY 25, 1917.

1,310,648.

Patented July 22, 1919.

INVENTOR.
F. H. Clift.
Per Robert E. Phillips
Attorney.

UNITED STATES PATENT OFFICE.

FREDERIC HOLLOCOOMBE CLIFT, OF BARNES, ENGLAND, ASSIGNOR TO S. SMITH & SONS MOTOR ACCESSORIES, LIMITED, OF ST. MARYLEBONE, LONDON, ENGLAND.

INSTRUMENT FOR INDICATING THE VELOCITY OF THE WIND OR OF AIR-CURRENTS.

1,310,648.  Specification of Letters Patent.  Patented July 22, 1919.

Application filed May 25, 1917. Serial No. 170,926.

*To all whom it may concern:*

Be it known that I, FREDERIC HOLLOCOOMBE CLIFT, a subject of the King of Great Britain and Ireland, residing at 95 Castlenau, Barnes, in the county of Surrey, England, have invented certain new and useful Improvements in Instruments for Indicating the Velocity of the Wind or of Air-Currents, of which the following is a specification.

This invention relates to instruments for indicating the velocity of the wind or of air currents, of the type in which the velocity is measured by the resultant effect of pressure and suction of the wind or air current obtained from a suitable head acting on and in conjunction with an indicator of the flexible diaphragm type the pressure acting on one side and the suction on the other side, and it consists of improvements in the construction of the indicating mechanism, the objects being to make the instrument more efficient and to enable it to be more easily and readily constructed and adjusted.

In the accompanying drawing—

Figure 1:
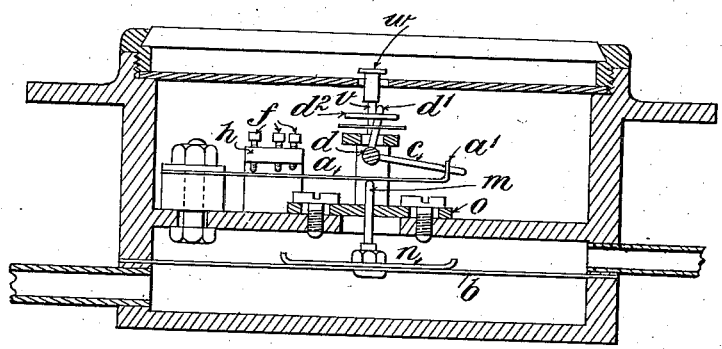
Figure 2:
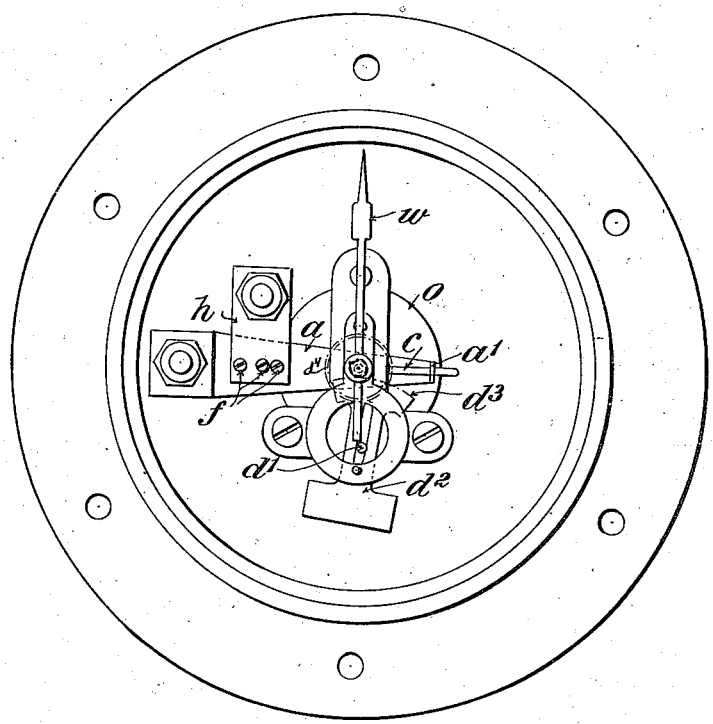

Figure 1 is a view in elevation—partly in section—of the improved instrument, and Fig. 2 is a view in plan thereof with the dial removed.

In both views similar parts are marked with like letters of reference.

According to the present invention, the free end of the spring finger $a$ by which the motion of the diaphragm $b$, operating through the rocking arm $c$ and the usual multiplying mechanism, is imparted to the index hand or finger $w$, positively engages the rocking arm so that said arm is compelled to follow the motion of the spring finger in both directions. The spring finger $a$ is so shaped at its free end as to form an upwardly projecting arm $a^1$ in which is a hole or slot with which the end of the rocking arm $c$ engages. The mechanism by which the motion of said rocking arm is communicated to the index hand is of the well-known construction and comprises a rocking shaft $d$ carrying both the arm $c$ and a second arm $d^1$, a rocking lever $d^2$ with which the arm $d^1$ engages, a toothed quadrant $d^3$ carried by said rocking lever, and gearing with a pinion (not shown in the drawing) on the arbor $v$ which carries the index hand $w$, and a hair spring $d^4$ operating between the arbor $v$ and a fixed point.

By positively coupling the arm $c$ to the spring finger $a$ said spring finger operates to assist the hair spring $d^4$ to function and insures the arm $c$ following the motion of the spring finger in both directions, which prevents any possibility of the indicating mechanism sticking, especially when the index hand is descending the scale, thus avoiding any error which is exceedingly dangerous when these instruments are employed as speed indicators on aeroplanes and the like and when the speed of the machine is decreasing.

In order to obtain a very open scale with very small movement of the spring finger and to avoid the introduction of permanent stresses in said spring finger due to continually bending from one point, an adjustable stop device is employed. This device consists of a plurality of adjustable screws $f$ which are mounted in a block $h$ which is located adjacent to the point of anchorage of the spring finger, said screws being so located that they can be adjusted to cause the spring finger to come into contact with them progressively at different pressures as the forward end of the finger flexes upward.

The pin $m$ by which the motion of the flexible diaphragm $b$ is communicated to the spring finger $a$ is mounted on a plate $n$ carried by the diaphragm $b$ and said rod is guided by means of a guide plate $o$ which is mounted so as to be radially adjustable in respect to said pin. This is effected by making the holes in the plate larger than the screws by which said plate is fixed to the case of the instrument which allows the guide plate to be accurately centered with respect to said rod after the diaphragm is in place.

What I claim as my invention and desire to secure by Letters Patent is:—

1. In an instrument for indicating the velocity of the wind or of air currents of the type in which the velocity is measured by the resultant effect of pressure and suction created by the wind or air currents and acting on a flexible diaphragm, the combination with the diaphragm of an arbor carrying an indicating finger, a horizontally disposed rocking lever, coupling means between said lever and said arbor whereby the rocking motion of said arm imparts rotary motion to said arbor, a spring finger, a rocking shaft carrying two arms one of which engages a slot in the rocking arm and the other of which is in positive engagement with the free end of the spring finger, and a pin mounted on the diaphragm and engaging the under side of the spring finger.

2. In an instrument for indicating the velocity of the wind or of air currents of the type in which the velocity is measured by the resultant effect of pressure and suction created by the wind or air currents and acting on a flexible diaphragm, the combination with the diaphragm of an arbor carrying an indicating finger, a rocking lever, coupling means between said lever and said arbor whereby the rocking motion of said arm imparts a rotary motion to said arbor, a spring finger, a rocking shaft carrying two arms one of which engages a slot in the rocking arm and the other of which is in engagement with the free end of the spring finger, a pin mounted on the diaphragm and engaging the under side of said spring finger, and a guide for said pin capable of central adjustment in relation to said pin.

3. In an instrument for indicating the velocity of the wind or of air currents of the type in which the velocity is measured by the resultant effect of pressure and suction acting on a flexible diaphragm, the combination with the diaphragm of an arbor carrying the indicating finger, a rocking lever, coupling means between said lever and said arbor whereby the rocking motion of said arm imparts rotary motion to said arbor, a spring finger, a rocking shaft carrying two arms one of which engages a slot in the rocking arm and the other of which is in engagement with the free end of the spring finger, a pin mounted on the diaphragm and engaging the under side of the spring finger, a guide for said pin capable of central adjustment in relation to said pin, and of a plurality of adjustable screws arranged longitudinally in respect to the spring finger and capable of adjustment in relation to the plane of said spring finger.

4. In an instrument for indicating the velocity of the wind or of air currents of the type in which the velocity is measured by the resultant effect of the pressure and suction created by the wind or air currents and acting on a flexible diaphragm, the combination of a flexible diaphragm, a pin mounted on said diaphragm and engaging the under side of the spring finger, a guide for said pin capable of central adjustment in relation to said pin, an arbor carrying the indicating finger, a pinion on said arbor, a rocking lever, a quadrant rack carried by said lever and gearing with the pinion on the arbor, a spring finger, a rocking shaft carrying two arms one of which engages a slot in the rocking arm and the other of which is in engagement with the free end of the spring finger, and of a plurality of adjustable screws arranged longitudinally in respect to the spring finger and capable of adjustment in relation to the plane of said spring finger.

In testimony whereof I have signed my name.

FREDERIC HOLLOCOOMBE CLIFT.

Witnesses:
HARVEY J. BAVERSTICK,
CHARLES PACK.